March 8, 1966  G. V. HEDSTROM  3,238,812
DRIVE AXLE ASSEMBLY
Filed March 19, 1964  3 Sheets-Sheet 1
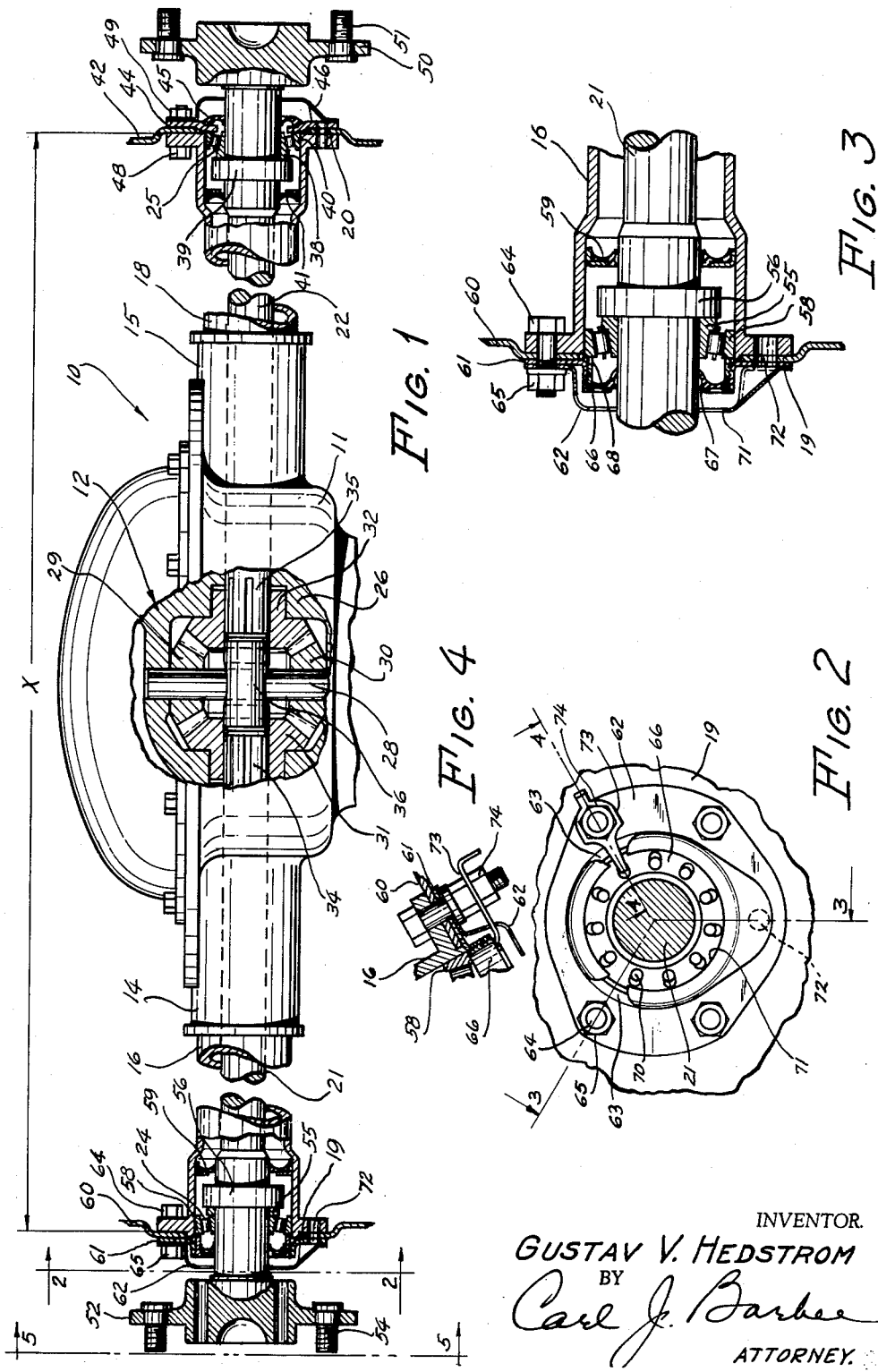
INVENTOR.
GUSTAV V. HEDSTROM
BY
Carl J. Barbee
ATTORNEY.

March 8, 1966 G. V. HEDSTROM 3,238,812
DRIVE AXLE ASSEMBLY
Filed March 19, 1964 3 Sheets-Sheet 2

INVENTOR.
GUSTAV V. HEDSTROM
BY
Carl J. Barbee
ATTORNEY.

March 8, 1966   G. V. HEDSTROM   3,238,812
DRIVE AXLE ASSEMBLY

Filed March 19, 1964   3 Sheets-Sheet 3

INVENTOR
GUSTAV V. HEDSTROM

BY Carl J. Barbee

ATTORNEY

United States Patent Office 3,238,812
Patented Mar. 8, 1966

3,238,812
DRIVE AXLE ASSEMBLY
Gustav V. Hedstrom, Kenosha, Wis., assignor to American Motors Corporation, Kenosha, Wis., a corporation of Maryland
Filed Mar. 19, 1964, Ser. No. 353,041
7 Claims. (Cl. 74—607)

This invention relates generally to the drive axle assemblies for vehicles and more particularly to an improvement in controlling the exit flow of lubricant in an assembly that utilizes flange type axles.

The use of flange type axles in a drive axle assembly has become relatively common in recent years despite the difficulties they cause during the effecting of the assembly. It is to be remembered that the traditional axle has a splined end that engages complimentary grooves in a bevel gear of the differential unit. The other end of the axle has a tapered seat which is of such a dimension that components such as the roller bearing, seal, bearing retainer, brake support plate, grease retainer, etc., can be installed from this end of the shaft before the wheel hub is located on the tapered seat. Securing the desired axle end play in the assembly is also easily accomplished with this arrangement. The flange type axle on the other hand has a flange instead of the tapered seat which necessitates the installation of the components from the splined end of the axle before its engagement with the bevel gear. Achieving the desired axle end play in the assembly by use of a threaded bearing retainer has necessitated a procedure which has prevented the use of a grease deflector ordinarily recommended by brake manufacturers. Thus any grease that leaks past the seal from the roller bearing can pass into the brake area and onto the brake shoes causing a safety hazard. This situation occurs most frequently when the vehicle has been parked for a substantial period of time.

Applicant is convinced of the value of the flange type axles primarily because they eliminate the need for wheel hubs and their troublesome tapered connections to the axles. Applicant, however, has devised a drive axle assembly that not only incorporates flanged axles but also provides a grease deflector for each wheel roller bearing. Further, Applicant has so adapted the assembly components that by use of a wrench having preferably two prongs that project through openings in an axle flange into passages in a threaded bearing retainer, the retainer can be moved to adjust the roller bearing cup in relation to the fixed bearing cone on the axle and thus provide the desired axle end play in the overall assembly even in the presence of the aforementioned grease deflector.

It is, therefore, an object of this invention to produce a new and improved drive axle assembly that incorporates flanged axles.

Another object of this invention is to provide grease retaining means for the wheel roller bearings of a drive axle assembly that incorporates flanged axles.

Another object of this invention is to provide a method of securing and maintaining the desired axle end play in a drive axle assembly that incorporates flanged axles and grease deflecting means for the roller wheel bearings associated therewith.

Other objects and advantages will become apparent from the following description in conjunction with the attached drawings in which:

FIGURE 1 is a fragmentary top section of the drive axle assembly.

FIGURE 2 is a vertical section along line 2—2 of FIGURE 1.

FIGURE 3 is a section along line 3—3 of FIGURE 2.

FIGURE 4 is a section along line 4—4 of FIGURE 2 showing the bearing retainer locking arrangement.

Figure 6:
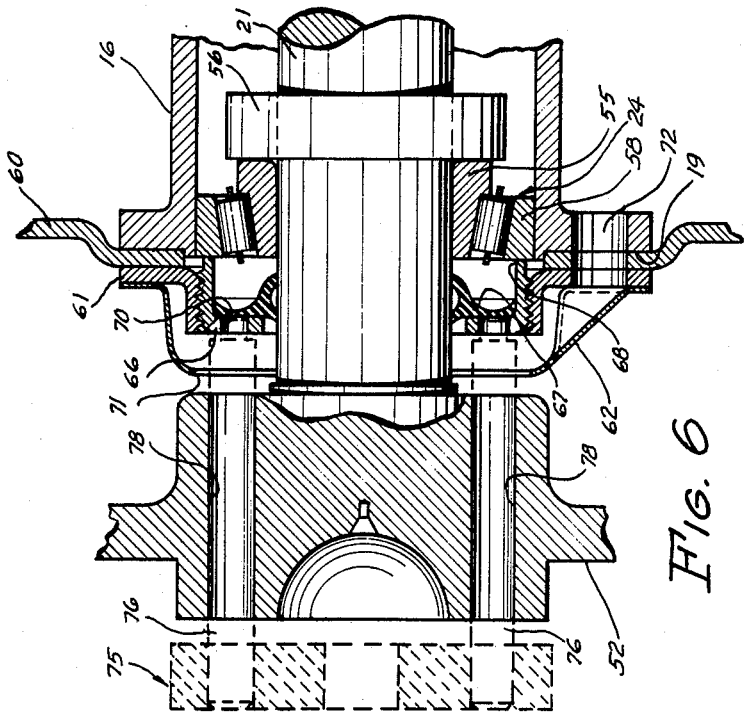
FIGURE 6 is a vertical section along 6—6 of FIGURE 5 also showing the adjusting means in position.
Figure 5:
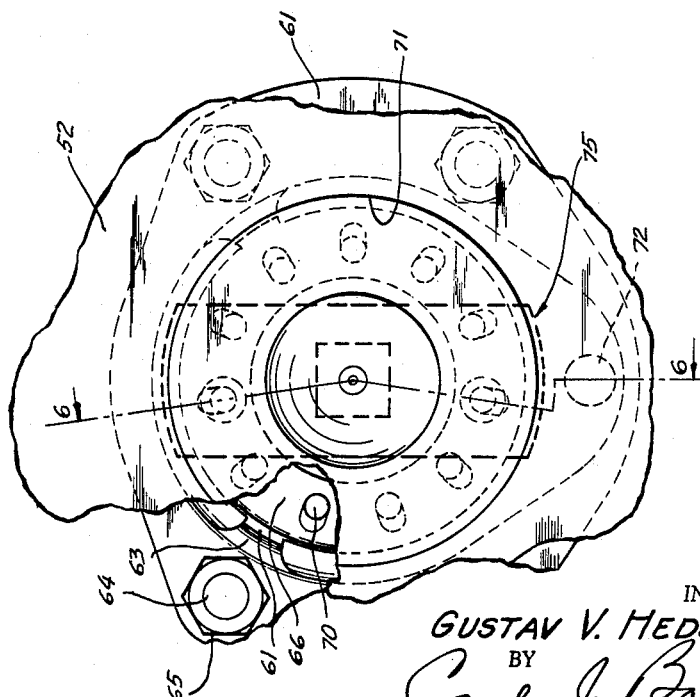
FIGURE 5 is a view along line 5—5 of FIGURE 1 but also including the adjusting means for achieving the desired axle end play shown in position in phantom lines.

Referring to FIGURE 1, 10 indicates generally a vehicle drive axle assembly. The assembly 10 includes a differential housing 11 with a conventional differential gear unit 12 located therein. The differential housing 11 has outwardly extending tubular projections 14 and 15 located on opposite sides thereof.

One end of axle tube 16 is located inside tubular projection 14 and one end of axle tube 18 is located inside tubular projection 15. The axle tubes 16 and 18 are rigidly anchored to differential housing 11 by welding where the tubes 16 and 18 enter the projections 14 and 15. The other end of axle tube 16 has a flanged face 19 and similarly the other end of axle tube 18 has a flanged face 20. The distance between faces 19 and 20 as shown by the dimension X in FIGURE 1 is closely held as it is important in achieving the desired axle end play in the drive axle assembly.

Drive axles 21 and 22 extend through axle tubes 16 and 18 respectively and engage differential gear unit 12. Roller bearing unit 24 along with its seal containing bearing retainer rotatably supports and restrains axle 21 in axle tube 16 and roller bearing unit 25 performs a similar function for axle 22 in axle tube 18.

In a satisfactory vehicle drive axle assembly as detailed above, it is necessary to provide axle end play in the overall assembly of .004″ to .008″ with a desired figure of .006″. This allows the axles the "float" needed when the vehicle travels on a circular path. This end play or clearance is generally achieved by adjusting the clearance between the cup and cone of one axle roller bearing after previously removing same from the other. It is apparent that the dimensions of the internal components of the assembly must, therefore, be closely held as was dimension X to achieve this objective.

Differential gear unit 12 as mentioned previously is of conventional construction. It includes a ring gear bolted to a differential case 26 and driven by a mating pinon gear which is the driving gear for the drive axle assembly. The ring gear and pinion gear are not shown since they form no part of the invention. Likewise, the bearings that rotatably support the differential case 26 in differential housing 11 are not shown as they form no part of the invention. Differential gear unit 12 also includes a shaft 28 which connects pinion bevel gears 29 and 30 to the differential case 26. Meshing with gears 29 and 30 are side bevel gears 31 and 32. Gears 31 and 32 have internal grooves which receive splined end 34 of axle 21 and splined end 35 of axle 22 respectively. A thrust block 36 is located between and abuts ends 34 and 35 of axles 21 and 22. The block 36 also has a slot for passage therethrough of shaft 28. It will be noted that the slot is of such a size (as indicated by the dotted lines) to permit axial movement of the block 36 and the axles 21 and 22 abutting thereto relative to shaft 28 during the effecting of the assembly 10 and when same is in use.

As mentioned previously, axle 22 is rotatably supported in axle tube 18 by bearing sub-assembly 25. This sub-assembly includes a cone 38 located on axle 22 by collar 39 and a cup 40 positioned in axle tube 18. An inner seal 41 restricts movement of lubricant from sub-assembly 25 toward gear unit 12. Mounted on flanged face 20 of axle tube 18 is brake support plate 42. Bearing retainer 44 containing flexible seal 45 integrally affixed thereto is mounted on brake support plate 42. Bearing retainer 44 has a peripheral shoulder which abuts cup 40 and locates the cup 40 in axle tube 18. Grease deflector 46 is mounted on bearing retainer 44. Grease deflector 46 has a drain (not shown) that aligns with a port in brake support plate 42 an a port in flange face 20 to allow exit from the brake area of lubricant that has moved outward from cone 38 past seal 45 so that any escaped lubricant is disposed of on that side of brake support plate 42 which is not in communication with the brake shoes and brake drums. Brake support plate 42, bearing retainer 44 and grease deflector 46 are affixed to flange face 20 of axle tube 18 by suitable bolts 48 and nuts 49. Drive axle 22 has an integral flange 50 located on the axle end that projects from axle tube 18. Flange 50 is adapted to support a brake drum and wheel (not shown) by studs 51 or other suitable means.

At the other end of the drive axle assembly 10, drive axle 21 is rotatably supported in axle tube 16 by bearing sub-assembly 24. Located outside sub-assembly 24 and beyond axle tube 16 associated therewith is integral flange 52 of drive axle 21. This flange, like flange 50 of drive axle 22, is adapted to support a brake drum and wheel assembly by studs 54 or the like. The brake drum includes a conventional lining 80 which is engaged by conventional brake shoes 81 during braking action. The brake drum is anchored to the annular flange portion 82 of the brake drum carrying plate, identified generally by the numeral 83. The wheel rim 84 is anchored to the peripheral portion 85 of the central portion 86 of the wheel and rim assembly. Wheel portion 86 is also anchored to the axle flange 52 as by means of the bolts 54. It is, of course, important that any lubricant that might escape past the seal 70 should be guided or directed by the lubricant deflector 62 to that side of the brake support plate 60 which is out of communication with the brake drum linings 80 and the brake shoes 81. Viewing FIGURE 6, the flow of such escaped lubricant would be directed by the deflector 62 through the passage indicated by the numeral 72 so that such escaped lubricant is not directed into contact with the brake drum linings and brake shoes.

Bearing sub-assembly 24 as more clearly shown in FIGURES 2, 3, 4 and 7 includes a cone 55 located on axle 21 by collar 56 and the associated bearing cup 58 mounted in axle tube 16. An inner seal 59 tends to keep the lubricant from leaving sub-assembly 24. Mounted on flange face 19 of axle tube 16 is brake support plate 60. Cover 61 and subsequently grease deflector 62 along with plate 60 are secured to flange face 19 by bolts 64 and nuts 65. Cover 61 has an internal thread in which is threaded bearing retainer 66 which contains a flexible seal 67 affixed thereto. Bearing retainer 66 has a peripheral shoulder 68 adapted to contact cup 58 when bearing retainer 66 is threaded into cover 61. Bearing retainer 66 also has a plurality of circumferentially equally spaced passages 70 located on a surface outward from shoulder 68 and extending from its external thread toward the axle 21. Grease deflector 62 also has an aperture 71 through which extends drive axle 21. Aperture 71 is in addition of such size as not to restrict from view passages 70 of bearing retainer 66 as seen in FIGURE 2.

Figure 7:
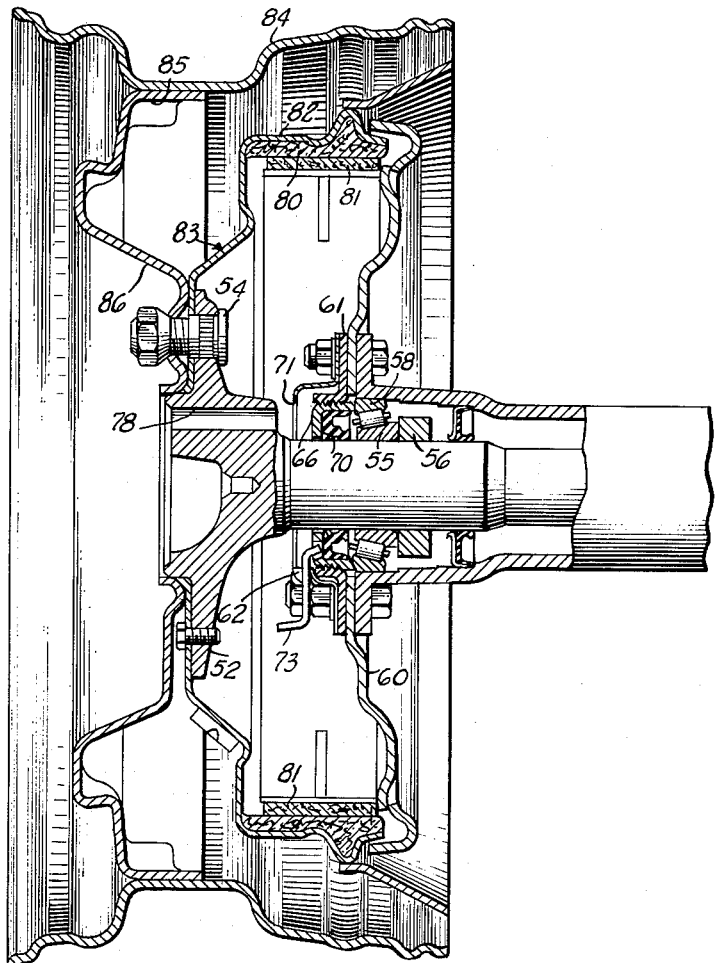
FIGURE 7 is an enlarged detail sectional view similar to FIGURE 6, however, taken on a section line which would be coincident with the section line 4—4 as viewed in FIGURE 2 and FIGURE 7 includes a showing of brake components at the bearing adjusting end of the drive axle assembly.

Also by referring to FIGURES 2, 3 and 7, drain 72 of grease deflector 62 is disclosed. Drain 72 is aligned with suitable ports in cover 61, brake support plate 60 and flange face 19 to allow drainage of grease that moves past seal 67 into the grease deflector 62 to continue out of the brake area. Grease deflector 62 also has a pair of inlets 63 therethrough to permit locking plate 73 to engage one of the plurality of passages 70 in bearing retainer 66 to prevent relative movement between bearing retainer 66 and cover 61. Anchoring the locking plate 73 is nut 74.

It is to be noted that the thread of bearing retainer 66 is so constructed that threading the retainer into cover 61 $\frac{1}{11}$ of a revolution or advancing to the next inlet in deflector 62 advances bearing retainer 66 .005″ axially along its thread. By moving the bearing retainer 66 $\frac{1}{2}$ of this distance and inserting the lock plate on the other side of grease retainer 62 through the other inlet 63 allows an adjustment of .0025″.

Having thus described the invention, it will be realized that the drawing merely shows a preferred embodiment thereof and that various changes in size, shape or arrangement of parts may be employed without departing from the spirit of the invention or the scope of the subjoined claims.

I claim:
1. A vehicle drive axle assembly comprising:
 (a) a hollow axle housing having an entrance;
 (b) an axle having one end extending into said housing through said entrance and a flanged end located outside of said housing at said entrance, said flange of said axle having an opening therethrough and situated eccentrically of the axial center of the axle and flange;
 (c) an internally threaded cover anchored to and beyond the end of the axle housing;
 (d) a cup and cone type roller bearing rotatably supporting said axle in said housing inward of said internal thread in said cover;
 (e) a bearing retainer surrounding said axle and having an external thread engaging said internal thread of said cover, said retainer being adapted to abut said cup of said bearing, said retainer having a passage therein located between said external thread and said axle and being aligned with said opening in said axle flange through said entrance.
2. A vehicle drive axle assembly comprising:
 (a) a hollow axle housing having an entrance;
 (b) an axle having one end extending into said housing through said entrance and a flanged end located outside of said housing at said entrance, said flange of said axle having an opening therethrough and situated eccentrically of the axial center of the axle and flange;
 (c) an internally threaded cover anchored to and beyond the end of the axle housing;
 (d) a cup and cone type roller bearing rotatably supporting said axle in said housing inward of said internal thread in said cover;
 (e) a bearing retainer surrounding said axle and having an external thread engaging said internal thread of said cover, said retainer being adapted to abut said cup of said bearing, said retainer having a plurality of passages therein located between said external thread and said axle and alignable with said opening in said axle flange through said entrance;
 (f) and a grease deflector attached to said housing and extending outward of said entrance and beyond said bearing, said grease deflector having an aperture for said axle extending therethrough and such aperture being of sufficient inside diameter to provide for the alignment therethrough of said opening in said axle flange and any of said retainer passages.
3. A vehicle drive axle assembly comprising:
 (a) a hollow axle housing having an entrance;
 (b) an axle having one end extending into said housing through said entrance and a flanged end located out- side of said housing at said entrance, said flange of said axle having a pair of openings therethrough, each of said openings being located on generally opposite sides of said axle from the other and radially spaced from the axial center of the axle and flange;
(c) an internally threaded cover anchored to and beyond the end of the axle housing;
(d) a cup and cone type roller bearing rotatably supporting said axle in said housing inward of said internal thread in said cover;
(e) a bearing retainer surrounding said axle and having an external thread engaging said internal thread of said cover, said retainer being adapted to abut said cup of said bearing, said retainer having a plurality of circumferentially equally spaced passages therein located between said external thread and said axle, pairs of said passages being alignable with said pair of openings in said axle flange through said entrance;
(f) and a grease deflector attached to said housing and extending outward of said entrance and beyond said bearing, said grease deflector having an aperture for said axle extending therethrough and such aperture being of sufficient inside diameter to provide for the alignment therethrough of said pair of openings in said axle flange with said pairs of said plurality of passages in said bearing retainer.

4. A vehicle drive axle assembly comprising:
(a) a hollow axle housing having an entrance;
(b) an axle having one end extending into said housing through said entrance and a flanged end located outside of said housing at said entrance, said flange of said axle having a pair of openings therethrough, each of said openings being located on generally opposite sides of said axle from the other and radially spaced from the axial center of the axle and flange;
(c) an internally threaded cover anchored to and beyond the end of the axle housing;
(d) a cup and cone type roller bearing rotatably supporting said axle in said housing inward of said internal thread in said cover;
(e) a bearing retainer surrounding said axle and having an external thread engaging said internal thread of said cover, said retainer being adapted to abut said cup of said bearing, said retainer also having a radially inwardly directed flange remote from said cup and surrounding and approaching said axle, said retainer flange having a plurality of circumferentially equally spaced passages therein located between said external thread and said axle, pairs of said passages being alignable with said pair of openings in said axle flange through said entrance;
(f) sealing means for said bearing, said means being located between said retainer flange and said bearing;
(g) and a grease deflector attached to said housing and extending outward of said entrance and beyond said bearing retainer, said grease deflector having an aperture for said axle extending therethrough and such aperture being of sufficient inside diameter to provide for the alignment therethrough of said pair of openings in said axle flange with said pairs of said plurality of passages in said bearing retainer.

5. A vehicle drive axle assembly comprising:
(a) a hollow axle housing having mounting face equipped entrance with a drain port in said face;
(b) an axle having one end extending into said housing through said entrance and a flanged end located outside of said housing at said mounting face, said flange of said axle having a pair of openings therethrough, each of said openings being located on generally opposite sides of said axle from the other;
(c) a cup and cone type roller bearing rotatably supporting said axle in said housing inward of said entrance;
(d) a brake support plate having a drain port therein and surrounding said entrance and mounted on said mounting face of said housing;
(e) a cover having a drain port therein and mounted on said brake support plate outward of said mounting face of said housing, said cover having an internal thread surrounding said axle;
(f) a bearing retainer surrounding said axle and having an external thread engaging said internal thread of said cover, said retainer being adapted to engage said cup of said bearing, said retainer also having a flange remote from said cup and surrounding and approaching said axle, said retainer flange having a plurality of circumferentially equally spaced passages therein located between said external thread and said axle, pairs of said passages being alignable with said pair of openings in said axle flange;
(g) sealing means for said bearing, said means being located between said retainer flange and said bearing;
(h) and a grease deflector attached to said cover and extending outward therefrom and beyond said bearing, said grease deflector having an aperture for said axle extending therethrough and for the alignment therethrough of said pair of openings in said axle flange with said pairs of said plurality of passages in said bearing retainer, said grease deflector also having a drain port, said drain port being aligned with drain ports in said cover, brake support plate and mounting face of said housing to conduct grease from said grease retainer.

6. The vehicle drive axle assembly of claim 5 further comprising: locking means to prevent movement of said bearing retainer in said cover.

7. A vehicle drive axle assembly comprising:
(a) a hollow axle housing having mounting face equipped entrance with a drain port in said face;
(b) an axle having one end extending into said housing through said entrance and a flanged end located outside said housing at said mounting face, said flange of said axle having a pair of openings therethrough, each of said openings being located on generally opposite sides of said axle from the other;
(c) a cup and cone type roller bearing rotatably supporting said axle in said housing inward of said entrance;
(d) a brake support plate having a drain port therein and surrounding said entrance and mounted on said mounting face of said housing;
(e) a cover having a drain port therein and mounted on said brake support plate outward of said mounting face of said housing, said cover having an internal thread surrounding said axle;
(f) a bearing retainer surrounding said axle and having an external thread engaging said internal thread of said cover, said retainer being adapted to engage said cup of said bearing, said retainer also having a flange remote from said cup and surrounding and approaching said axle, said retainer flange having a plurality of circumferentially equally spaced passages therein located between said external thread and said axle, pairs of said passages being alignable with said pair of openings in said axle flange;
(g) sealing means for said bearing, said means being located between said retainer flange and said bearing;
(h) and a grease deflector attached to said cover and extending outward therefrom and beyond said bearing, said grease deflector having an aperture for said axle extending therethrough and for the alignment therethrough of said pair of openings in said axle flange with said pairs of said plurality of passages in said bearing retainer, said grease deflector also having a drain port, said drain port being aligned with the drain ports in said cover, brake support plate and mounting face of said housing to conduct grease from said grease deflector, said grease deflector having a pair of spaced apart inlets remote from said drain port;

(i) locking means to prevent movement of said retainer on said cover, said locking means comprising a lock plate having one portion adapted to pass through either of said two inlets through said grease deflector to engage a passage in said bearing retainer, the other portion of said lock plate being adapted to be rigidly connected to said housing.

References Cited by the Examiner
UNITED STATES PATENTS

| | | | |
|---|---|---|---|
| 1,097,096 | 5/1914 | Hunteman | 81—90.4 |
| 2,497,789 | 2/1950 | Mueller | 81—90.4 |
| 3,026,156 | 3/1962 | Straus | 308—187 |

BROUGHTON G. DURHAM, *Primary Examiner.*

W. S. RATLIFF, *Assistant Examiner.*